United States Patent
Jiang et al.

(10) Patent No.: US 10,721,026 B2
(45) Date of Patent: Jul. 21, 2020

(54) BLOCK ACK FRAME WITH FLOW CONTROL

(71) Applicant: Marvell World Trade Ltd., St. Michael (BB)

(72) Inventors: Jinjing Jiang, San Jose, CA (US); Liwen Chu, San Ramon, CA (US); Yi-Ling Chao, Sunnyvale, CA (US); Hongyuan Zhang, Fremont, CA (US); Hui-Ling Lou, Sunnyvale, CA (US)

(73) Assignee: Marvell Asia Pte, Ltd., Singapore (SG)

(*) Notice: Subject to any disclaimer, the term of this patent is extended or adjusted under 35 U.S.C. 154(b) by 35 days.

(21) Appl. No.: 16/051,211

(22) Filed: Jul. 31, 2018

(65) Prior Publication Data
US 2019/0253194 A1 Aug. 15, 2019

Related U.S. Application Data

(60) Provisional application No. 62/628,812, filed on Feb. 9, 2018.

(51) Int. Cl.
| | |
|---|---|
| *H04L 1/16* | (2006.01) |
| *H04L 12/851* | (2013.01) |
| *H04L 12/807* | (2013.01) |
| *H04L 12/801* | (2013.01) |
| *H04L 1/18* | (2006.01) |

(Continued)

(52) U.S. Cl.
CPC .......... *H04L 1/1621* (2013.01); *H04L 1/1671* (2013.01); *H04L 1/1854* (2013.01); *H04L 1/1887* (2013.01); *H04L 47/10* (2013.01); *H04L 47/2441* (2013.01); *H04L 47/27* (2013.01);

(Continued)

(58) Field of Classification Search
None
See application file for complete search history.

(56) References Cited

U.S. PATENT DOCUMENTS

| | | | |
|---|---|---|---|
| 9,503,245 B1 | 11/2016 | Choi et al. | |
| 2012/0244806 A1 | 9/2012 | Sekiya | |
| 2019/0045537 A1* | 2/2019 | Seok | H04L 1/1854 |

FOREIGN PATENT DOCUMENTS

| | | |
|---|---|---|
| EP | 2531986 | 12/2012 |
| WO | WO-2011/060156 | 5/2011 |
| WO | WO-2014/186523 | 11/2014 |
| WO | WO-2016/085613 | 6/2016 |

(Continued)

OTHER PUBLICATIONS

International Search Report and Written Opinion in International Patent Application No. PCT/US2018/044622, dated Oct. 11, 2018 (14 pages).

(Continued)

*Primary Examiner* — Kouroush Mohebbi

(57) ABSTRACT

A first communication device generates a block acknowledgement (BA) frame that includes (i) acknowledgement information to indicate, to a second communication device, whether the first communication device successfully received multiple media access control (MAC) frames transmitted by the second communication device, and (ii) an indication of a change in a BA session between the first communication device and the second communication device. The first communication device transmits the BA frame to the second communication device, where the BA frame causes the second communication device to adopt the change in the BA session in response to receiving the BA frame.

20 Claims, 8 Drawing Sheets

(51) Int. Cl.
*H04W 72/12* (2009.01)
*H04W 16/14* (2009.01)
*H04W 88/06* (2009.01)
*H04W 84/12* (2009.01)

(52) U.S. Cl.
CPC ............ *H04W 72/12* (2013.01); *H04W 16/14* (2013.01); *H04W 84/12* (2013.01); *H04W 88/06* (2013.01)

(56) References Cited

FOREIGN PATENT DOCUMENTS

| WO | WO-2017/062947 | 4/2017 |
| WO | WO-2017/143350 | 8/2017 |

OTHER PUBLICATIONS

IEEE Std 802.11-REVmc™/D8.0 (revision of IEEE Std. 802.11TM-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

* cited by examiner

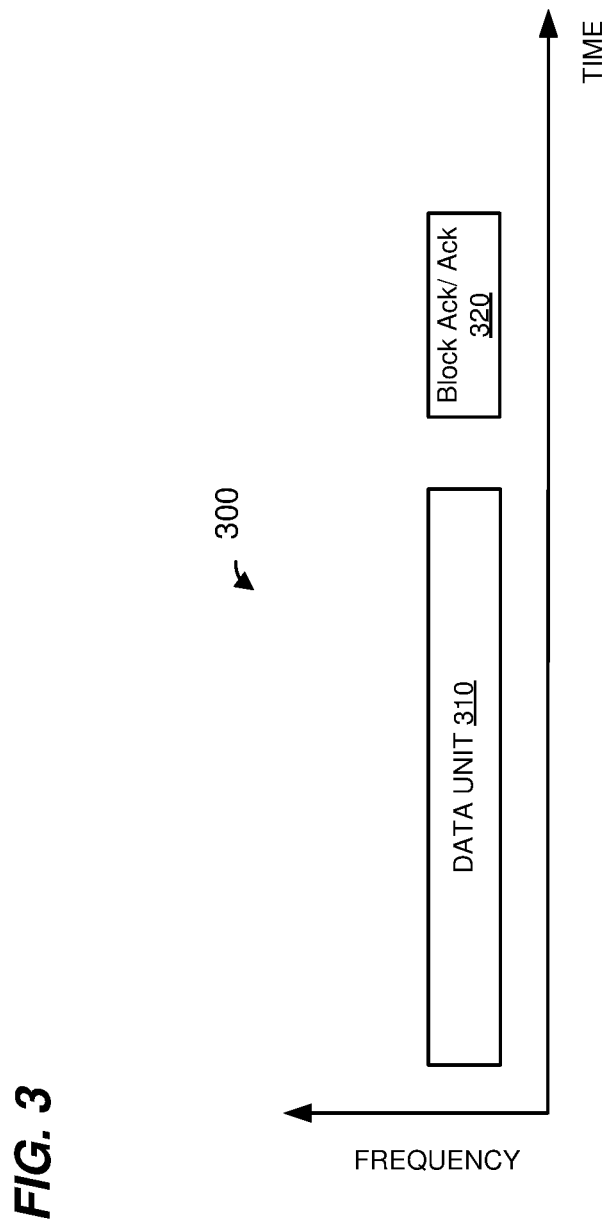

A first communication device generates a block acknowledgement (BA) frame that includes (i) acknowledgement information to acknowledge, to a second communication device, receipt of multiple media access control (MAC) frames transmitted by the second communication device, and (ii) an indication of a change in a BA session between the first communication device and the second communication device 704

The first communication device transmits the BA frame to the second communication device, where the BA frame is configured to cause the second communication device to adopt the change in the BA session in response to receiving the BA frame 708

```
┌─────────────────────────────────────────────┐
│ A first communication device transmits an   │
│ aggregate media access control (MAC)        │
│ protocol data unit (A-MPDU) that includes   │
│ multiple MAC frames during a block          │
│ acknowledgement (BA) session between the    │
│ first communication device and a second     │
│ communication device, where the A-MPDU is   │
│ intended for the second communication       │
│ device 804                                  │
└─────────────────────────────────────────────┘
                      │
                      ▼
┌─────────────────────────────────────────────┐
│ The first communication device receives a   │
│ BA frame from the second communication      │
│ device, where the BA frame includes (i)     │
│ acknowledgement information to acknowledge  │
│ receipt, by the second communication        │
│ device, of one or more of the MAC frames    │
│ included in the A-MPDU, and (ii) an         │
│ indication of a change in the BA session 808│
└─────────────────────────────────────────────┘
                      │
                      ▼
┌─────────────────────────────────────────────┐
│ In response to receiving the BA frame, the  │
│ first communication device adopts the       │
│ change in the BA session 812                │
└─────────────────────────────────────────────┘
```

BLOCK ACK FRAME WITH FLOW CONTROL

CROSS REFERENCES TO RELATED APPLICATIONS

This application claims the benefit of U.S. Provisional Patent Application No. 62/628,812, entitled "Block ACK Frame Variant with Simple Flow Control," filed on Feb. 9, 2018, which is hereby expressly incorporated herein by reference in its entirety.

FIELD OF TECHNOLOGY

The present disclosure relates generally to wireless communication systems and, more particularly, to wireless communication devices that communicate using multiple wireless communication technologies.

BACKGROUND

Wireless communication networks continue to increase in demand as consumers flock toward mobile computing devices and as manufacturers continue to develop wireless devices with greater capabilities and features. Numerous types of wireless networks and network protocols exist. For example, wireless local area networks (WLAN) typically operate according to an Electronics Engineers (IEEE) 802.11 standard wireless communication protocol, first promulgated in 1999. These protocols include IEEE 802.11a, 802.11b, 802.11g, 802.11n, and 802.11ac, which operate at different spectrum bands and/or different multiplexing or spread spectrum schemes to deliver various bit rates to devices on a wireless network. Any of these IEEE 802.11 networks are often referred to as WiFi networks. Another wireless communication protocol is the Bluetooth protocol, which is commonly used in an ad-hoc network topology configuration for peer-to-peer communication between devices, such as between a cellular handset phone and a wireless earpiece headset. As yet another example, near field communication (NFC) protocols are for peer to peer communication between two devices in near proximity to each other.

SUMMARY

In an embodiment, a method includes generating, at a first communication device, a block acknowledgement (BA) frame that includes (i) acknowledgement information to indicate, to a second communication device, whether the first communication device successfully received multiple media access control (MAC) frames transmitted by the second communication device, and (ii) an indication of a change in a BA session between the first communication device and the second communication device; and transmitting, by the first communication device, the BA frame to the second communication device, wherein the BA frame is configured to cause the second communication device to adopt the change in the BA session in response to receiving the BA frame.

In another embodiment, an apparatus includes a network interface device associated with a first communication device, the network interface device including one or more integrated circuit (IC) devices configured to: generate a block acknowledgement (BA) frame that includes (i) acknowledgement information to indicate, to a second communication device, whether the first communication device successfully received multiple media access control (MAC) frames transmitted by the second communication device, and (ii) an indication of a change in a BA session between the first communication device and the second communication device, and transmit the BA frame to the second communication device, wherein the BA frame is configured to cause the second communication device to adopt the change in the BA session in response to receiving the BA frame.

In another embodiment, a method includes transmitting, by a first communication device, an aggregate media access control (MAC) protocol data unit (A-MPDU) that includes multiple MAC frames during a block acknowledgment (BA) session between the first communication device and a second communication device, wherein the A-MPDU is intended for the second communication device; receiving, at the first communication device, a BA frame from the second communication device, wherein the BA frame includes (i) acknowledgement information to indicate whether the second communication device successfully received the one or more of the MAC frames included in the A-MPDU, and (ii) an indication of a change in the BA session; and in response to receiving the BA frame, adopting, at the first communication device, the change in the BA session.

In yet another embodiment, an apparatus includes a network interface device associated with a first communication device, the network interface device including one or more integrated circuits (IC) devices configured to: transmit an aggregate media access control (MAC) protocol data unit (A-MPDU) that includes multiple MAC frames during a block acknowledgment (BA) session between the first communication device and a second communication device, wherein the A-MPDU is intended for the second communication device; receive a BA frame from the second communication device, wherein the BA frame includes (i) acknowledgement information to acknowledge receipt, by the second communication device, of one or more of the MAC frames included in the A-MPDU, and (ii) an indication of a change in the BA session; and in response to receiving the BA frame, adopt the change in the BA session.

BRIEF DESCRIPTION OF THE DRAWINGS

FIG. 3 is a diagram of an example transmission sequence in a WLAN, according to an embodiment.

FIG. 7 is a flow diagram of an example method for communicating in a wireless communication network, according to an embodiment.

FIG. 8 is a flow diagram of another example method for communicating in a wireless communication network, according to an embodiment.

DETAILED DESCRIPTION

Figure 1:
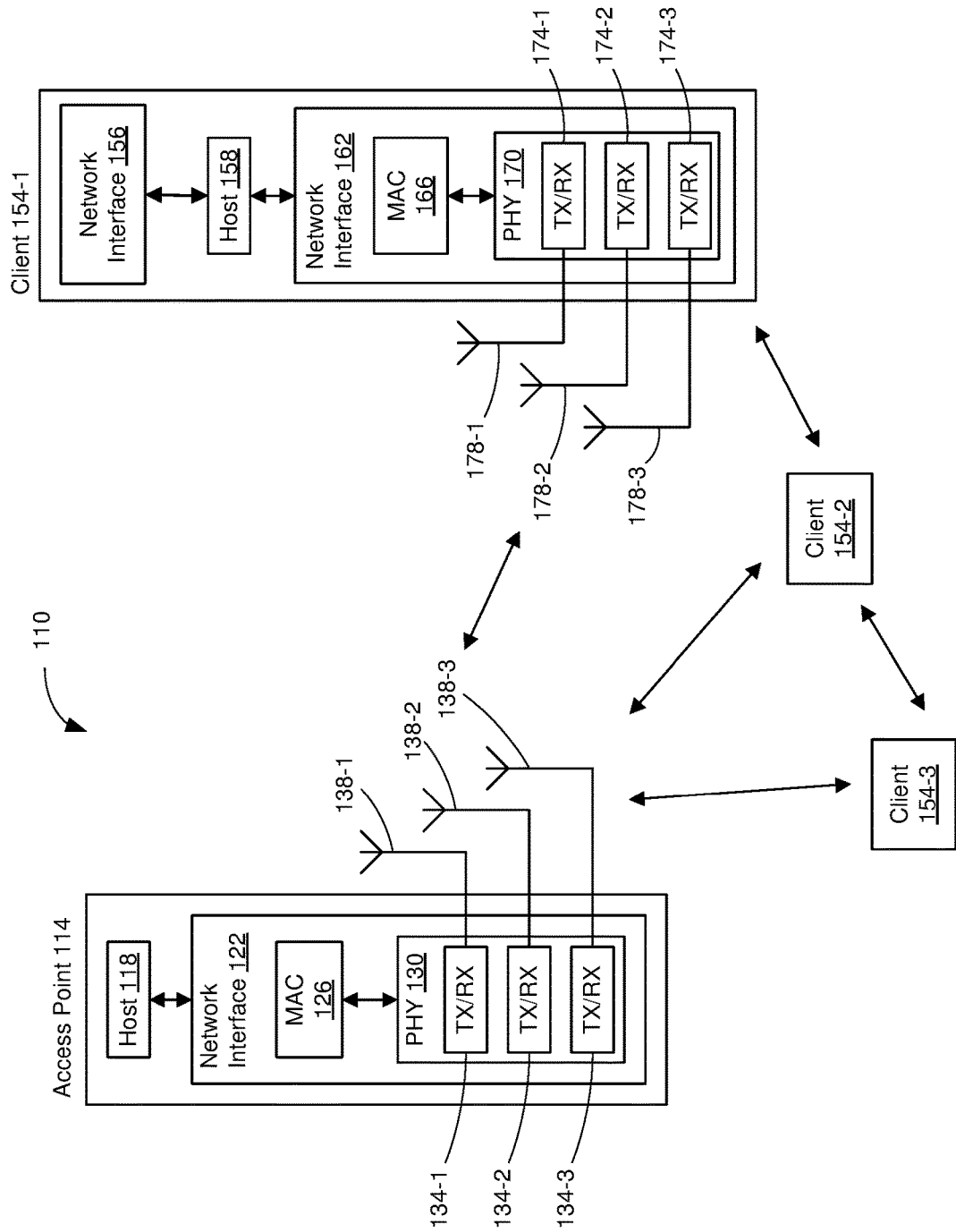
FIG. 1 is a block diagram of an example wireless local area network (WLAN), according to an embodiment.

Wireless communication devices often employ multiple communication technologies that co-exist in the communication devices. For example, a communication device may operate according to a Bluetooth protocol, and may also operate in a WLAN network according to a WLAN communication protocol, such as the IEEE 802.11n Standard or the IEEE 802.11ac Standard. In some situations, concurrent operation of multiple systems operating according to different communication protocols within a device can cause interference between the multiple systems. For example, when a communication device includes both WLAN and Bluetooth communication systems, which have overlapping frequencies, the transmissions of one system may interrupt, degrade, or otherwise interfere with reception by the other system. To avoid interfering with one another, the WLAN and Bluetooth communication systems may cooperate by time-sharing the communication channel. For example, one communication system, such as Bluetooth, may be given priority to use the communication channel during periodic time slots. During such time slots designated for Bluetooth, the WLAN communication system is supposed to go quiet to avoid interfering with the Bluetooth communications.

In some situations, a wireless network device such as an access point (AP) of a WLAN may be transmitting data to a client station that is time-sharing its communication channel between its WLAN communication system and, for example, a Bluetooth communication system. However, the AP may be unaware that the client station is time-sharing its communication channel. Accordingly, in embodiments described herein, a client station sends signals to an AP to indicate to the AP that the client station will be unavailable in the near future so that the AP will not attempt to transmit to the client station (sometimes referred to as "flow control"). In an embodiment, the client station sends a signal to the AP so that the AP will stop transmitting data to the client station shortly before the next designated time slot for Bluetooth begins. In an embodiment, the client station sends a signal to the AP to indicate to the AP to stop sending aggregate data units, such as aggregate media access control (MAC) protocol data units (A-MPDUs). In an embodiment, the client station sends a signal to the AP to indicate to the AP to resume transmitting to the client station or to resume transmitting A-MPDUs to the client station. In some embodiments, an acknowledgement (ACK) frame includes a flow control field that the client device can use to indicate to the AP to stop/resume transmitting to the client device or to stop/resume transmitting A-MPDUs to the client device.

According to embodiments of the techniques described herein, efficiency is improved by the ACK frame being used to both acknowledge a frame transmitted by a peer WLAN device (e.g., AP) and to indicate to the AP that the client station will be unavailable in the near future. According to some embodiments, a client station is able to inform an AP to stop sending A-MPDUs to the client station without the client station having to delete an existing block acknowledgement session with the AP.

FIG. 1 is a block diagram of an example wireless local area network (WLAN) 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Network interface 156 has a similar structure as network interface 162, with a corresponding MAC unit, PHY unit, one or more transceivers and one or more antennas. In some embodiments, one or more antennas are shared by network interface 156 and network interface 162. In some embodiments, network interface 156 and network interface 162 correspond to different radio access technologies. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
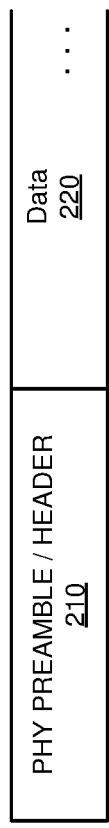
FIG. 2A is a block diagram of an example physical layer (PHY) data unit, according an embodiment.

FIG. 2A is a diagram of a PHY data unit 200 that the AP 114 is configured to transmit to one or more client stations 154 (e.g., the client stations 154-1, 154-2, etc.), according to an embodiment. In an embodiment, one or more client stations 154 (e.g., the client stations 154-1, 154-2, etc.) are also configured to transmit data units the same as or similar to the data unit 200 to the AP 114. The data unit 200 conforms to a first communication protocol and occupies a 2.16 GHz bandwidth. Data units similar to the data unit 200 occupy other suitable bandwidth such as 4.32 GHz, 6.48 GHz, 8.64 GHz, 10.8 GHz, 12.96 GHz, for example, or other suitable bandwidths, in other embodiments. The data unit 200 includes a PHY preamble/header 210 and a data portion 220. The preamble/header 210 includes one or more training fields generally used for synchronization and channel estimation, in an embodiment. The preamble/header 210 additionally includes one or more signal fields used to indicate various parameters needed at a receiving communication device to properly decode the data portion 220, in an embodiment.

Figure 2B:
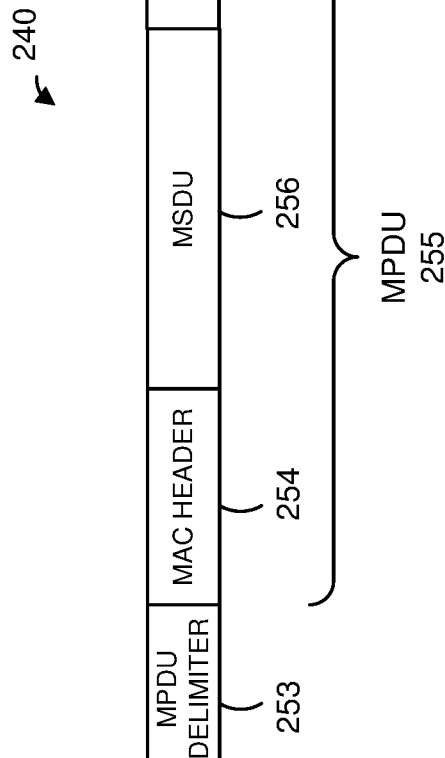
FIG. 2B is a diagram of an example data portion of the PHY data unit of FIG. 2A, according to an embodiment.

FIG. 2B is a diagram of a MAC layer data unit 240, according to an embodiment. In an embodiment, the MAC layer data unit 240 is included in the data portion 220 of the PHY data unit 200 of FIG. 2A. In another embodiment, the MAC layer data unit 240 is included in a data portion of a PHY data unit different from the PHY data unit 200 of FIG. 2A. The MAC layer data unit 240 includes a MPDU delimiter 253 followed by an MPDU 255. The MPDU 255 includes a MAC header 254 and a MAC layer service data unit (MSDU) 256. In some embodiments, the data portion 220 of the PHY data unit 200 of FIG. 2A includes an aggregate MPDU (A-MPDU) that aggregates multiple MPDU delimiter fields 253, each MPDU delimiter field 253 followed by a respective MPDU 255. In some embodiments, each of one or more of the MSDUs 256 included in the data unit 240 is an aggregate MSDU (A-MSDU) that aggregates multiple MSDUs. In such embodiments, the MAC header 254 of the A-MSDU is followed by multiple MSDUs. In an embodiment, the first communication protocol defines a maximum number of MPDUs and, accordingly, a maximum number of MSDUs/A-MSDUs, that can be aggregated in a single A-MPDU. For example, the first communication protocol specifies that a maximum of 256 MPDUs, 512 MPDUs, 1024 MPDUs, or any other suitable number of MPDUs, can be aggregated in a single A-MPDU, in an embodiment. In another embodiment, the first communication protocol specifies another suitable maximum number of MPDUs that can be aggregated in a single A-MPDU.

In some embodiments, the MAC layer data unit 240 additionally includes one or more padding portions (not illustrated), each of the one or more padding portions having one or more padding bits. For example, a respective padding portion is included with (e.g., appended to) each of the one or more MPDUs 255 and/or MSDUs 256 in the data unit 240 to ensure that each MPDU 255 and/or MSDU 256 includes an integer number of octets of bits indicated by a length indicator in the MPDU delimiter 253 that immediately precedes the MPDU 255, in an embodiment.

FIG. 3 is a diagram of an example transmission sequence 300 in a WLAN such as the WLAN 110, according to an embodiment. A transmitting device generates and transmits a PHY data unit 310. In an embodiment, the PHY data unit 310 corresponds to the PHY data unit 200 of FIG. 2A. In another embodiment, the PHY data unit 310 is a suitable data unit different from the PHY data unit 200 of FIG. 2A. A receiving device receives the PHY data unit 310 and, in response to receiving the PHY data unit 310, generates and transmits a PHY data unit 320 that includes an acknowledgment (ACK) frame to acknowledge receipt of one or more MAC layer data units (e.g., MPDUs) in the PHY data unit 310. The PHY data unit 320 is sometimes referred to herein as an "ACK packet". In an embodiment, the transmitting device is an AP (e.g., AP 114) and the receiving device is a client station (e.g., the client station 154-1). In another embodiment, the transmitting device is a client station (e.g., the client station 154-1) and the receiving device is the AP (e.g., AP 114). In yet another embodiment, the transmitting device is a first client station (e.g., the client station 154-1) and the receiving device is a second client station (e.g., the client station 154-2).

In an embodiment, the PHY data unit 310 includes an A-MPDU that aggregates multiple MPDUs. For ease of explanation, the PHY data unit 310 is sometimes referred to herein as an A-MPDU 310. In an embodiment, the A-MPDU 310 includes one or more MPDUs corresponding to each of one or more traffic classes, where each traffic class is associated with a particular traffic type (e.g., network control, video, voice, streaming multimedia, etc.). In an embodiment, the traffic classes are associated with particular quality of service (QoS) requirements and/or priority levels (e.g., background, best effort, video, voice, etc.). In an embodiment, each traffic class corresponds to a particular traffic identifier (TID). In an embodiment, the A-MPDU 310 includes one or more sets of multiple MPDUs corresponding to one or more traffic classes for which block acknowledgement sessions have been previously set up between the transmitting device and the receiving device and are currently active. For example, the A-MPDU 310 includes a first set of multiple MPDUs corresponding to a first traffic class, such as a traffic class that corresponds to voice traffic, for which a first block acknowledgement session between the transmitting device and the receiving device is currently active, in an embodiment. The A-MPDU 310 additionally or alternatively includes a second set of multiple MPDUs corresponding to a second traffic class, such as a traffic class that corresponds to web page traffic, for which a second block acknowledgement session between the transmitting device and the receiving device is currently active.

In an embodiment, the A-MPDU 310 additionally or alternatively includes one or more management and/or control frames for which acknowledgement is required or expected. Management frames included in the A-MPDU 310 generally carry information used to manage communication devices operating in the WLAN (e.g., WLAN 110), in at least some embodiments. Examples of management frames included in the A-MPDU 310, according to some embodiments, include an association request data unit, an association response data unit, a re-association request data unit, a re-association response data unit, a probe request data unit, a probe response data unit, etc. Control frames included in the A-MPDU 310 generally carry information used to assist in delivery of data and/or control channel access in the WLAN (e.g., WLAN 110), in at least some embodiments. Examples of control frames included in the A-MPDU 310 include a power save poll (PS-poll) data unit, a block acknowledgement request (BAR) data unit, etc. In an embodiment, the number of management and/or control frames that can be included in the A-MPDU 310 is limited to one management frame or one control frame. In another embodiment, the A-MPDU 310 includes multiple management frames and/or control frames. In an embodiment, a management frame included in the A-MPDU 310 is a unicast frame from the transmitting device to the receiving device. Aggregation of multicast or broadcast management and control frames in the A-MPDU 310 is not allowed, in an embodiment.

Upon receiving the A-MPDU 310, the receiving device transmits the acknowledgement frame 320 to the transmitting device. In an embodiment, the receiving device is a client station (e.g., the client station 154-1) and the client stations transmits the acknowledgement packet 320 to the AP (e.g., the AP 114). The acknowledgement packet 320 includes a MAC control frame (e.g., an ACK frame, a block ACK (BA) frame, etc.), in an embodiment. In some embodiments, the acknowledgement packet 320 includes a block acknowledgement (BA) frame. For ease of explanation, the acknowledgment packet 320 is sometimes referred to herein as a "block acknowledgement frame" or a "BA frame". In some embodiments, the block acknowledgement frame 320 includes block acknowledgement information to acknowledge, to the AP, receipt of multiple MAC frames included in the A-MPDU 310 transmitted to the client station by the AP. In addition to the block acknowledgement information, the BA frame 320 also includes an indication of a change in a BA session (e.g., a change to a parameter corresponding to the BA session) between the client station and the AP, in an embodiment. In some embodiments, the BA frame 320 includes a field that includes the indication of the change in the BA session between the client station and the AP. According to one embodiment, the change indicated in the BA frame 320 is mandatory and serves as a requirement for the AP to adopt the change. In another embodiment, the change indicated in the BA frame 320 is optional, and serves as a request for the AP to adopt the change.

The indication of the change includes an indication to stop transmitting A-MPDUs to the client station, in an embodiment.

In some embodiments, the indication of the change includes an indication to shorten a maximum length of A-MPDUs that are permitted to be transmitted to the client station by the AP during the BA session. The indication to shorten the maximum length of A-MPDUs includes an indication of a fraction with respect to a previous maximum length of A-MPDUs permitted to be transmitted to the client station during the BA session, in an embodiment.

In some embodiments, the indication of the change includes an indication of a time period during which transmissions of A-MPDUs to the client station are to be stopped during the BA session. In some scenarios, the multiple MAC frames included in the A-MPDU 310 correspond to a particular traffic class. Accordingly, in some embodiments, the BA frame 320 transmitted by the client station to the AP includes block acknowledgement information to acknowledge the multiple MAC frames corresponding to the particular traffic class, and the indication of the change includes an indication to the AP to stop transmitting A-MPDUs corresponding to the particular traffic class during the BA session with the client station. In other scenarios, the multiple MAC frames included in the A-MPDU 310 correspond to multiple different traffic classes. Accordingly, in some embodiments, the BA frame 320 transmitted by the client station to the AP includes block acknowledgement information to acknowledge multiple MAC frames corresponding to the multiple different traffic classes, and the indication of the change includes an indication to the AP to stop transmitting A-MPDUs that include MAC frames corresponding to any of the multiple different traffic classes during the BA session with the client station.

In some embodiments, the block acknowledgement frame 320 additionally includes acknowledgement information to acknowledge one or more management frames and/or control frames, included in the A-MPDU 310, for which acknowledgement is required or expected.

In some embodiments, prior to the transmission sequence 300, the transmitting device and the receiving device negotiate aggregation and/or block acknowledgement parameters to be used in the transmission sequence 300. For example, the transmitting device and/or the receiving device announces whether or not the device supports aggregation of MPDUs corresponding to multiple traffic classes in a single A-MPDU and/or aggregation of management frames with MPDUs that include data. Thus, for example, if the receiving device and the transmitting device both support aggregation of MPDUs corresponding to multiple traffic classes, then the transmitting device aggregates MPDUs corresponding to multiple traffic classes in the A-MPDU 310, in at least some situations, in an embodiment. On the other hand, if the receiving device and/or the transmitting device do not support aggregation of MPDUs corresponding to multiple traffic classes, the transmitting device limits aggregation in the A-MPDU 310 to only a single traffic class, in an embodiment.

In an embodiment, the transmitting device and/or the receiving device additionally or alternatively announces whether or not the device supports acknowledgement of MPDUs corresponding to multiple traffic classes in a single acknowledgement frame. If the transmitting device and the receiving device both support acknowledgement of MPDUs corresponding to multiple traffic classes in a single acknowledgement frame, then the receiving device includes acknowledgement information corresponding to multiple traffic classes in the block acknowledgement frame 320. On the other hand, in an embodiment, if the receiving device and/or the transmitting device does not support acknowledgement of MPDUs corresponding to multiple traffic classes in a single acknowledgement frame, and the A-MPDU 310 that aggregates multiple MPDUs corresponding to multiple traffic classes, then the receiving devices may acknowledge the A-MPDU 310 by transmitting multiple acknowledgement data units (e.g., included in respective PHY data units transmission of which is separated by an interframe space) that respectively acknowledge MPDUs of different traffic classes.

Figure 4:
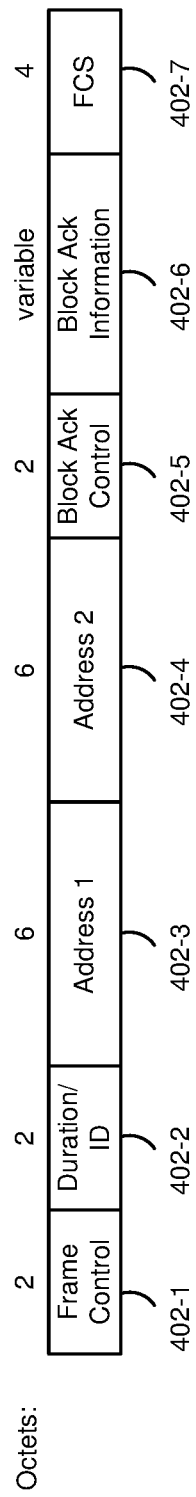
FIG. 4 is a diagram of an example block acknowledgement (BA) frame, according to an embodiment.

FIG. 4 is a diagram of an example acknowledgement frame 400, according to an embodiment. In an embodiment, the acknowledgement frame 400 corresponds to (e.g., is included in) the acknowledgement packet 320 of FIG. 3. In another embodiment, the acknowledgement frame 400 is included in a suitable PHY data unit different than the acknowledgement packet 320 of FIG. 3.

The acknowledgement frame 400 includes a plurality of fields 402. In the embodiment illustrated in FIG. 4, the fields 402 include a frame control field 402-1, a duration/ID field 402-2, a first address (e.g., a receiver address) field 402-3, a second address (e.g., a transmitter address) field 402-4, a Block Ack control field 402-5, a Block Ack information field 402-6, and a data unit sequence check (FCS) field 402-7. The number indicated above each of the fields 402 in FIG. 4 indicates an example number of octets of bits in the corresponding field 402. In other embodiments, one or more of the fields 402 has a different suitable length. In other embodiments, one or more additional fields are included in the acknowledgment frame 400 and/or one or more of the fields 402 are omitted from the acknowledgment frame 400.

Figure 5:
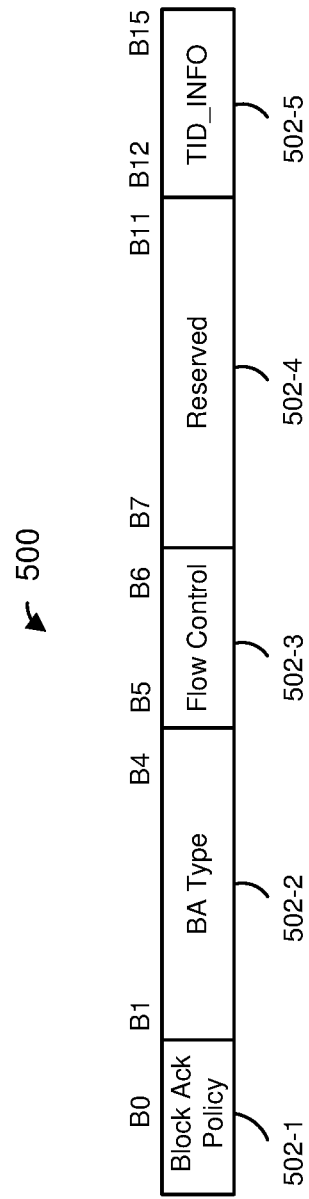
FIG. 5 is a diagram of an example Block Ack control field included in a BA frame, according to an embodiment.

FIG. 5 is a diagram of an example Block Ack control field 500 included in an acknowledgement frame, according to an embodiment. The Block Ack control field 500 corresponds to the Block Ack control field 402-5, in an embodiment. The Block Ack control field 500 includes a plurality of subfields 502. The subfields 502 collectively comprise 16 bits, in the illustrated embodiment. The subfields 502 collectively comprise a suitable number of bits different than 16 bits, in other embodiments. In the embodiment illustrated in FIG. 5, the Block Ack control field 500 includes a Block Ack policy subfield 502-1, a BA type subfield 502-2, a flow control subfield 502-3, a reserved subfield 502-4, and a TID information subfield 502-5. Bit allocation for each of the subfields 502, according to an example embodiment, is illustrated in FIG. 5 above the corresponding subfields 502. In other embodiments, one or more of the subfields 502 has a different suitable length. In other embodiments, one or more additional subfields are included in the Block Ack control field 500 and/or one or more of the subfields 502 are omitted from the Block Ack control field 500.

In an embodiment, the flow control subfield 502-3 indicates a change in a BA session between i) the device (e.g., a client station) sending the acknowledgement frame that includes the control field 500 and ii) the device (e.g., AP) that sent the MPDUs being acknowledged by the acknowledgement frame. In an embodiment, the change indicated in the flow control subfield 502-3 is mandatory and serves as a requirement for the device that sent the MPDUs being acknowledged by the acknowledgement frame to adopt the change. In another embodiment, the change indicated in the flow control subfield 502-3 is optional, and serves as a request for the device that sent the MPDUs being acknowledged by the acknowledgement frame to adopt the change. For example, the flow control subfield 502-3 is set to a logic one-one (11) to indicate to the AP to stop transmitting A-MPDUs to the client station, in an embodiment. For example, the flow control subfield 502-3 is set to a first logic value (e.g., one-zero (10)) to indicate to the AP to shorten a maximum length of A-MPDUs to be transmitted to the client station by a first fraction with respect to a previous maximum length of A-MPDUs transmitted to the client station by the AP, in an embodiment. For example, the first fraction may be one-half (½) of a previous maximum length of A-MPDUs transmitted to the client station by the AP, in an embodiment. In an embodiment, the flow control subfield 502-3 is set to a second logic value (e.g., zero-one (01)) to indicate to the AP to shorten a maximum length of A-MPDUs to be transmitted to the client station by a second fraction with respect to a previous maximum length of A-MPDUs transmitted to the client station by the AP, in an embodiment. For example, the second fraction may be one-fourth (¼) of a previous maximum length of A-MPDUs transmitted to the client station by the AP, in an embodiment. In an embodiment, the flow control subfield 502-3 is set to a third logic value (e.g., zero-zero (00)) to indicate no changes in the BA session between the client station and the AP, in an embodiment.

Figure 6:
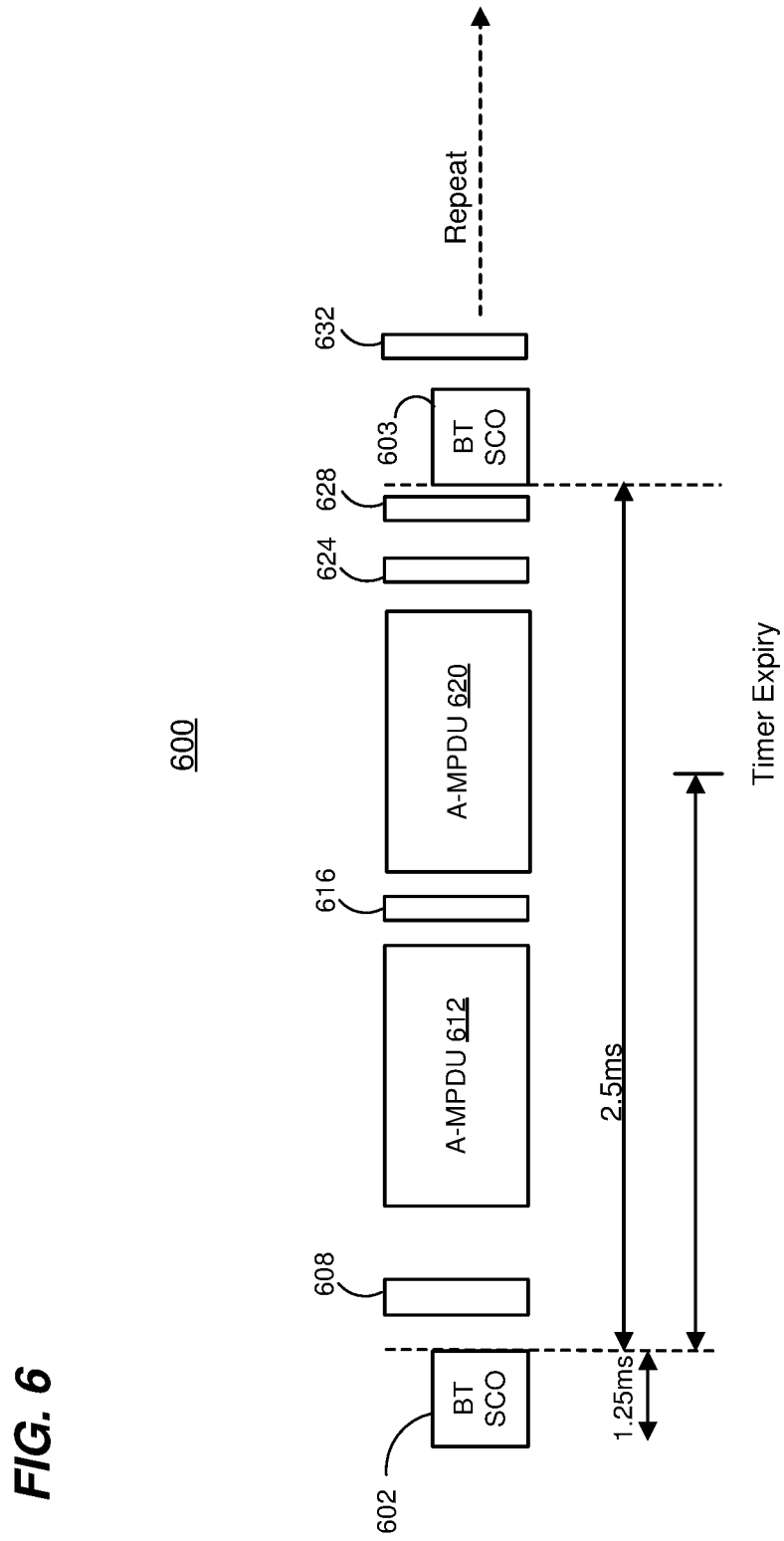
FIG. 6 is a timing diagram illustrating an example process in which a power management mode is used to regulate the transmission of WLAN data packets to facilitate interference avoidance with a Bluetooth connection, according to an embodiment.

FIG. 6 is a timing diagram 600 illustrating an example process in which a first communication device utilizes a power management mode of a WLAN to stop a second communication device from sending WLAN packets to the first device approximately when a Bluetooth transmission is expected between the first communication device and a third communication device. The first communication device is a client station such as the client station 154, in an embodiment. The second communication device is an AP such as the AP 114, in an embodiment. In the example process of FIG. 6, a time-sharing scheme is generally utilized. For example, Bluetooth transmissions in profiles such as synchronous connection oriented (SCO) and Advanced Audio Distribution Profile (A2DP) are spaced apart so that WLAN transmissions may occur in between the Bluetooth transmissions, in an embodiment.

Timeslots 602, 603, etc., are reserved for Bluetooth SCO data transmissions between the first communication device and the third communication device, which occur via a Bluetooth link, in an embodiment. In an embodiment, the duration of each timeslot 602, 603, etc., is 1.25 ms. In another embodiment, the duration of each timeslot 602, 603, etc., is another suitable length that is longer or shorter than 1.25 ms. In an embodiment, a 2.5 ms timeslot is available between adjacent pairs of timeslots 602, 603, etc., for WLAN transmissions between the first communication device and the second communication device.

In an embodiment, the client station transmits, prior to each Bluetooth timeslot 602, 603, etc., a frame to the AP to prompt the AP to refrain from transmitting to the client station. For example, the client station transmits, prior to each Bluetooth timeslot 602, 603, etc., a frame (e.g., a QoS Null frame with a power management (PM) field set to logic one) that indicates to the AP that the client station is entering a PM mode. Similarly, the client station transmits, after each Bluetooth timeslot 602, 603, etc., a frame to the AP to prompt the AP to resume transmitting to the client station. For example, the client station transmits, after each Bluetooth timeslot 602, 603, etc., a frame (e.g., a further QoS Null frame with the PM field set to logic zero) that indicates to the AP that the client station is no longer in the PM mode.

In conjunction with the Bluetooth transmission 602 ending, the client station starts a timer (e.g., of the network interface 162, of the MAC processor 166, etc.). The timer may be configured to expire at some desired or pre-determined time before the beginning of the next Bluetooth timeslot 603. In the example of FIG. 6, it is known or expected that the next Bluetooth timeslot 603 is to occur 2.5 ms after the end of the previous Bluetooth transmission 602. Thus, the timer may be configured to expire at a time 2.5 ms−DELTA, where DELTA is a suitable time duration that is determined based on a maximum of length of A-MPDUs that the AP 114 is transmitting during the BA session, according to an embodiment. In other embodiments, DELTA is additionally or alternatively determined based on one or more suitable parameters.

After an end of the Bluetooth timeslot 602, the client station transmits a packet 608 to the AP to indicate to the AP that the client station is not in the PM mode. For example, the packet 608 sent by the client station may include QoS Null frame with the PM field set to logic zero. In response to receiving the packet 608, the AP resumes transmitting A-MPDUs to the client station according to one or more BA sessions previously set up with the client station.

For example, the AP transmits an A-MPDU 612 to the client station. In response to receiving the A-MPDU 612, the client station transmits an ACK packet 616 to acknowledge one or more MPDUs in the A-MPDU 612. In an embodiment, the ACK packet 616 includes a BA frame. In an embodiment, the BA frame has a structure the same as or similar to the BA frames discussed above with reference to FIGS. 3-6. Next, the AP transmits another A-MPDU 620 to the client station, and in response to receiving the A-MPDU 620, the client station transmits an ACK packet 624 to acknowledge one or more MPDUs in the A-MPDU 620. In an embodiment, the ACK packet 624 includes a BA frame. In an embodiment, the BA frame has a structure the same as or similar to the BA frames discussed above with reference to FIGS. 3-6.

Prior to or in conjunction with generating the BA frame included in the ACK packet 624, the client station determines that the client station should prompt the AP to stop transmitting A-MPDUs to the client station because the next Bluetooth timeslot 603 is imminent. For example, the client station determines that the client station should prompt the AP to stop transmitting A-MPDUs to the client station in response to the timer expiring.

Thus, the client station generates the BA frame in the ACK packet 624 to include an indication of a change in the BA session between the client station and the AP. In an embodiment, the change indicated in the BA frame is mandatory and serves as a requirement for the AP to adopt the change. In another embodiment, the change indicated in the BA frame is optional and serves as a request for the AP to adopt the change. For example, the client station generates the BA frame in the ACK packet 624 to include an indication that the AP should stop transmitting, at least temporarily, A-MPDUs to the client station. In some embodiments, the client station generates the BA frame in the ACK packet 624 in a manner the same as or similar to the BA frame in the ACK packet 320 (FIG. 3), according to some embodiments. In an embodiment, the BA frame in the ACK packet 624 has the frame structure illustrated in FIGS. 4 and 5, and the client station sets the flow control field 502-3 to indicate that the AP should stop transmitting, at least temporarily, A-MPDUs to the client station.

In response to receiving the BA frame 624, the AP implements the change in the BA session indicated in the BA frame 624. For example, the AP stops transmitting, at least temporarily, A-MPDUs to the client station. As another example, the AP stops transmitting to the client station, at least temporarily, A-MPDUs having durations that are above a threshold duration.

Next, the client station transmits a packet 628 to the AP to indicate to the AP that the client station is in the PM mode. For example, the packet 628 sent by the client station may include a QoS Null frame with the PM field set to logic one. In response to receiving the packet 628, the AP stops transmitting any packets to the client station.

After the Bluetooth timeslot 603 has ended, the client station transmits a packet 632 to the AP to indicate to the AP that the client station is not in the PM mode. For example, the packet 632 sent by the client station may include QoS Null frame with the PM field set to logic zero. In response to receiving the packet 632, the AP resumes transmitting A-MPDUs to the client station according to one or more BA sessions previously set up with the client station, according to an embodiment. As another example, the AP resumes transmitting to the client station A-MPDUs having durations that are above the threshold duration.

In an embodiment in which the BA frame 624 includes an indication of a time period during which transmissions of A-MPDUs to the client station are to be stopped during the BA session, an end of the indicated time period in the BA frame 624 coincides with an end of the Bluetooth timeslot 603, and thus the AP knows, based on the indicated time period in the BA frame 624, that the AP can resume transmitting A-MPDUs to the client station without the client station having to explicitly notify the AP after the Bluetooth timeslot 603, according to an embodiment.

FIG. 7 is a flow diagram of an example method 700 for communicating in a communication network, according to an embodiment. In an embodiment, the method 700 is implemented by a first communication device. The first communication device is an AP such as the AP 114 or a client station such as the client station 154-1, for example, in various embodiments. For example, the method 700 is implemented by the network interface device 122 (e.g., the MAC processor 126 and/or by the PHY processor 130) of the AP 114, in an embodiment. As another example, the method 700 is implemented by the network interface device 162 (e.g., the MAC processor 166 and/or by the PHY processor 170) of the client station 154-1, in another embodiment. In other embodiments, the method 700 is implemented by another suitable communication device.

At block 704, a block acknowledgement frame to acknowledge receipt of multiple MAC data units is generated by the first communication device. In an embodiment, the multiple MAC frames being acknowledged by the block acknowledgement frame are transmitted by a second communication device. For example, the second communication device is an AP such as the AP 114 or a client station such as the client station 154-1, in various embodiments. In an embodiment, the BA frame in the ACK packet 320 of FIG. 3 is generated at block 704. In an embodiment, the BA frame 400 of FIG. 4 is generated at block 704. In another embodiment, a suitable acknowledgement frame different from the BA frame 320 of FIG. 3 and from the BA frame 400 of FIG. 4 is generated at block 704. In an embodiment, the BA frame includes (i) acknowledgement information to indicate, to the second communication device, whether the first communication device correctly received the multiple MAC frames transmitted by the second communication device, and (ii) an indication of a change in a BA session between the first communication device and the second communication device.

For example, the BA frame generated at block 704 includes an indication that the second communication device is to stop transmitting A-MPDUs to the first communication device, in an embodiment. In an embodiment, the BA frame generated at block 704 includes an indication that the second communication device is to shorten a maximum length of A-MPDUs to be transmitted to the first communication device. For example, the BA frame generated at block 704 includes an indication of a fraction with respect to a previous maximum length of A-MPDUs set for the BA session, in an embodiment.

In an embodiment, the BA frame generated at block 704 also indicates a time period during which the second communication device is to effectuate the change to the BA session. In an embodiment, the BA frame generated at block 704 also indicates a time period during which the second communication device is to stop transmissions of A-MPDUs to the second communication device. In an embodiment, the BA frame generated at block 704 also indicates a time period during which the second communication device is to effectuate a shorter maximum length of A-MPDUs to the second communication device.

At block 708, the BA frame generated at block 704 is transmitted to the second communication device. The BA frame transmitted at block 708 is configured to cause the second communication device to adopt the change in the BA session in response to receiving the BA frame, in an embodiment. In an embodiment, the BA frame transmitted at block 708 is configured to prompt (e.g., request) the second communication device to adopt the change in the BA session in response to receiving the BA frame, in an embodiment. For example, the BA frame transmitted at block 708 is configured to prompt the second communication device to stop transmitting A-MPDUs to the first communication device, in an embodiment. In an embodiment, the BA frame transmitted at block 708 is configured to prompt the second communication device to shorten a maximum length of A-MPDUs to be transmitted to the first communication device. For example, the BA frame transmitted at block 708 is configured to prompt the second communication device to shorten a maximum length of A-MPDUs to be transmitted to the first communication device by a fraction with respect to a previous maximum length of A-MPDUs transmitted to the first communication device, in an embodiment. In an embodiment, the BA frame transmitted at block 708 is configured to prompt the second communication device to stop transmissions of A-MPDUs to the first communication device during the BA session during a particular time period indicated in the BA frame.

In an embodiment in which the BA frame (transmitted at block 708) indicates a time period during which the change in the BA session is to be implemented, the second communication device is configured to resume use of original BA session parameters after the time period has ended, without an explicit prompt from the first communication device to resume use of the original BA session parameters.

FIG. 8 is a flow diagram of an example method 800 for communicating in a communication network, according to an embodiment. In an embodiment, the method 800 is implemented by a first communication device. The first communication device is an AP such as the AP 114 or a client station such as the client station 154-1, for example, in various embodiments. For example, the method 800 is implemented by the network interface device 122 (e.g., the MAC processor 126 and/or by the PHY processor 130) of the AP 114, in an embodiment. As another example, the method 800 is implemented by the network interface device 162 (e.g., the MAC processor 166 and/or by the PHY processor 170) of the client station 154-1, in another embodiment. In other embodiments, the method 800 is implemented by another suitable communication device.

At block 804, the first communication device transmits an A-MPDU that includes multiple MAC frames during a BA session between the first communication device and a second communication device, where the A-MPDU is intended for the second communication device. For example, the second communication device is an AP such as the AP 114 or a client station such as the client station 154-1, in various embodiments.

At block 808, the first communication device receives a BA frame from the second communication device. In an embodiment, the BA frame in the ACK packet 320 of FIG. 3 is received at block 808. In an embodiment, the BA frame 400 of FIG. 4 is received at block 808. In another embodiment, a suitable acknowledgement frame different from the BA frame in the ACK packet 320 of FIG. 3 and from the BA frame 400 of FIG. 4 is received at block 808.

In an embodiment, the BA frame received at block 808 includes (i) acknowledgement information to indicate whether the second communication device successfully received the one or more of the MAC frames included in the A-MPDU transmitted at block 804, and (ii) an indication of a change in the BA session between the first communication device and the second communication device. In an embodiment, the indication of the change included in the BA frame received at block 808 is an indication to stop transmitting A-MPDUs to the second communication device. In an embodiment, the indication of the change included in the BA frame received at block 808 is an indication to shorten a maximum length of A-MPDUs to be transmitted to the second communication device during the BA session. For example, the indication to shorten the maximum length of A-MPDUs includes an indication of a fraction with respect to a previous maximum length of A-MPDUs transmitted to the second communication device, in an embodiment. In an embodiment, the BA frame received at block 808 also indicates a time period during which the second communication device is to effectuate the change to the BA session. In an embodiment, the BA frame received at block 808 also indicates a time period during which the second communication device is to stop transmissions of A-MPDUs to the second communication device. In an embodiment, the BA frame received at block 808 also indicates a time period during which the second communication device is to effectuate a shorter maximum length of A-MPDUs to the second communication device.

In response to receiving the BA frame at block 808, at block 812 the first communication device adopts the change in the BA session indicated in the BA frame. In an embodiment, the change adopted by the first communication device at block 812 is stopping transmitting A-MPDUs to the second communication device during the BA session. In an embodiment, the change adopted by the first communication device at block 812 is transmitting only A-MPDUs having a duration less than or equal to the shortened maximum length to the second communication device during the BA session. In an embodiment, the change adopted by the first communication device at block 812 is stopping transmission of A-MPDUs to the second communication device during the time period indicated in the received BA frame.

In an embodiment in which the BA frame (received at block 808) indicates a time period during which the change in the BA session is to be implemented, the second communication device is configured to resume use of original BA session parameters after the time period has ended, without an explicit prompt from the first communication device to resume use of the original BA session parameters. Thus, in an embodiment, the method 800 further includes (not shown in FIG. 8) the first communication device resuming use of the original BA session parameters after the time period has ended, without an explicit prompt from the first communication device to resume use of the original BA session parameters. In an embodiment, after stopping transmitting A-MPDUs to the second communication device during the BA session at block 812, in response to receiving the BA frame at block 808, the first communication device resumes transmitting A-MPDUs to the second communication device during the BA session after the indicated time period has ended. In an embodiment, after transmitting only A-MPDUs having a duration less than or equal to the shortened maximum length to the second communication device during the BA session, the first communication device resumes transmitting A-MPDUs having lengths greater than the shortened maximum length to the second communication device during the BA session after the indicated time period has ended. In an embodiment, the first communication device resumes transmitting A-MPDUs having lengths greater than the shortened maximum length to the second communication device by transmitting A-MPDUs having lengths less than or equal to the previous maximum length to the second communication device during the BA session.

In some embodiments, a communication device notifies other communication devices of its capability to generate and process BA frames such as described above. For example, a field within a capabilities information element (IE) is set to indicate that the communication device is capable of generating and processing BA frames such as described above, and the communication device transmits the capabilities IE to one or more other communication devices, such as during a WLAN association procedure, a WLAN reassociation procedure, etc. For example, the IEEE 802.11 Standard defines an extended capabilities IE having an extended capabilities field that is used to indicate the capabilities of a WLAN communication device. The IEEE 802.11 Standard defines the extended capabilities field to include several reserved bits. In an embodiment, one or more the reserved bits in the extended capabilities field are used to indicate that a communication device is capable of generating and processing BA frames such as described above. The AP is configured to transmit the extended capabilities IE in a beacon frame, according to an embodiment. The AP is configured to transmit the extended capabilities IE in an association response frame, a reassociation response frame etc., according to some embodiments. The client station is configured to transmit the extended capabilities IE in an association request frame, a reassociation request frame, etc., according to some embodiments.

In other embodiments, a field within another suitable IE, frame, etc., is set to indicate that the communication device is capable of generating and processing BA frames such as described above, and the communication device transmits the IE, frame, etc., to one or more other communication devices, such as during a WLAN association procedure, a WLAN reassociation procedure, etc. For example, a field within a vendor specific IE is set to indicate that the communication device is capable of generating and processing BA frames such as described above, according to an illustrative embodiment.

In an embodiment, a method includes generating, at a first communication device, a block acknowledgement (BA) frame that includes (i) acknowledgement information to indicate, to a second communication device, whether the first communication device successfully received multiple media access control (MAC) frames transmitted by the second communication device, and (ii) an indication of a change in a BA session between the first communication device and the second communication device; and transmitting, by the first communication device, the BA frame to the second communication device, wherein the BA frame is configured to cause the second communication device to adopt the change in the BA session in response to receiving the BA frame.

In other embodiments, the method further includes one of, or any suitable combination of two or more of, the following features.

Generating the BA frame includes generating a field, in the BA frame, that includes the indication of the change in the BA session.

The indication of the change includes an indication to stop transmitting aggregate MAC protocol data units (A-MPDUs) to the first communication device.

The indication of the change includes an indication to shorten a maximum length of aggregate MAC protocol data units (A-MPDUs) to be transmitted to the first communication device.

The indication to shorten the maximum length of A-MPDUs includes an indication of a fraction with respect to a previous maximum length of A-MPDUs.

The BA frame is generated to further include an indication of a time period during which the change in the BA session is to be effectuated.

The multiple MAC frames transmitted by the second communication device correspond to a first traffic class of a plurality of traffic classes, wherein generating the BA frame includes generating the BA frame to include block acknowledgement information to acknowledge the multiple MAC frames corresponding to the first traffic class, and the indication of the change includes an indication to stop transmitting aggregate MAC protocol data units (A-MPDUs) corresponding to the first traffic class during the BA session.

The multiple MAC frames transmitted by the second communication device correspond to multiple different traffic classes of a plurality of traffic classes, wherein generating the BA frame includes generating the BA frame to include block acknowledgement information to acknowledge multiple MAC frames corresponding to the multiple different traffic classes, and the indication of the change includes an indication to stop transmitting aggregate MAC protocol data units (A-MPDUs) that include MAC frames corresponding to any of the multiple different traffic classes during the BA session.

Generating, at the first communication device, an information element (IE) that includes an indication that the first communication device is capable of generating a BA frame configured to cause the second communication device to adopt a change in a BA session between the first communication device and the second communication device; and transmitting, by the first communication device, the IE to the second communication device, as part of an association procedure.

Receiving, at the first communication device, from the second communication device, an information element (IE) that includes an indication that the second communication device is capable of adopting a change in a BA session between the first communication device and the second communication device, wherein the IE is received at the first communication device as part of a beacon frame or an association procedure.

In another embodiment, an apparatus comprises a network interface device associated with a first communication device, the network interface device including one or more integrated circuit (IC) devices configured to generate a block acknowledgement (BA) frame that includes (i) acknowledgement information to acknowledge, to a second communication device, receipt of multiple media access control (MAC) frames transmitted by the second communication device, and (ii) an indication of a change in a BA session between the first communication device and the second communication device; and transmit the BA frame to the second communication device, wherein the BA frame is configured to cause the second communication device to adopt the change in the BA session in response to receiving the BA frame.

In other embodiments, the apparatus further includes one of, or any suitable combination of two or more of, the following features.

The one or more IC devices are configured to generate a field, in the BA frame, that includes the indication of the change in the BA session.

The indication of the change includes an indication to stop transmitting aggregate MAC protocol data units (A-MPDUs) to the first communication device.

The indication of the change includes an indication to shorten a maximum length of aggregate MAC protocol data units (A-MPDUs) to be transmitted to the first communication device.

The indication to shorten the maximum length of A-MPDUs includes an indication of a fraction with respect to a previous maximum length of A-MPDUs.

BA frame is generated to further include an indication of a time period during which the change in the BA session is to be effectuated.

The multiple MAC frames transmitted by the second communication device correspond to a first traffic class of a plurality of traffic classes, wherein the one or more IC devices are configured to generate the BA frame to include block acknowledgement information to acknowledge the multiple MAC frames corresponding to the first traffic class, and the indication of the change includes an indication to stop transmitting aggregate MAC protocol data units (A-MPDUs) corresponding to the first traffic class during the BA session.

The multiple MAC frames transmitted by the second communication device correspond to multiple different traffic classes of a plurality of traffic classes, wherein the one or more IC devices are configured to generate the BA frame to include block acknowledgement information to acknowledge multiple MAC frames corresponding to the multiple different traffic classes, and the indication of the change includes an indication to stop transmitting aggregate MAC protocol data units (A-MPDUs) that include MAC frames corresponding to any of the multiple different traffic classes during the BA session.

The one or more IC devices are configured to generate an information element (IE) that includes an indication that the first communication device is capable of generating a BA frame configured to cause the second communication device to adopt a change in a BA session between the first communication device and the second communication device; and transmit the IE to the second communication device, as part of an association procedure.

The one or more IC devices are configured to receive an information element (IE) from the second communication device, the IE received as part of a beacon frame or an association procedure, wherein the IE includes an indication that the second communication device is capable of adopting a change in a BA session between the first communication device and the second communication device.

In another embodiment, a method includes transmitting, by a first communication device, an aggregate media access control (MAC) protocol data unit (A-MPDU) that includes multiple MAC frames during a block acknowledgment (BA) session between the first communication device and a second communication device, wherein the A-MPDU is intended for the second communication device; receiving, at the first communication device, a BA frame from the second communication device, wherein the BA frame includes (i) acknowledgement information to acknowledge receipt, by the second communication device, of one or more of the MAC frames included in the A-MPDU, and (ii) an indication of a change in the BA session; and in response to receiving the BA frame, adopting, at the first communication device, the change in the BA session.

In other embodiments, the method further includes one of, or any suitable combination of two or more of, the following features.

The indication of the change in the BA session is included in a field of the BA frame.

The indication of the change includes an indication to stop transmitting A-MPDUs to the second communication device, wherein adopting the required change in the BA session includes stopping transmitting A-MPDUs to the second communication device during the BA session, and the method further includes, after stopping transmitting A-MPDUs to the second communication device during the BA session in response to receiving the BA frame, resuming transmitting, by the first communication device, A-MPDUs to the second communication device during the BA session.

The indication of the change includes an indication to shorten a maximum length of A-MPDUs to be transmitted to the second communication device during the BA session, wherein adopting the change in the BA session includes transmitting only A-MPDUs having a duration less than or equal to the shortened maximum length to the second communication device during the BA session, and the method further includes, after transmitting only A-MPDUs having a duration less than or equal to the shortened maximum length to the second communication device during the BA session, resuming transmitting, by the first communication device, A-MPDUs having lengths greater than the shortened maximum length to the second communication device during the BA session.

The indication to shorten the maximum length of A-MPDUs includes an indication of a fraction with respect to a previous maximum length of A-MPDUs, wherein resuming transmitting A-MPDUs having lengths greater than the shortened maximum length to the second communication device during the BA session comprises transmitting A-MPDUs having lengths less than or equal to the previous maximum length to the second communication device during the BA session.

The received BA frame further includes an indication of a time period during which the change in the BA session is to be effectuated; adopting the change in the BA session includes adopting the require change during the time period; and the method further includes, after the time period, resuming use of original BA session parameters during the BA session.

The indication of the change in the BA frame includes an indication to stop transmitting A-MPDUs corresponding to the first traffic class to the second communication device during the BA session, wherein adopting the change in the BA session includes stopping transmitting, to the second communication device, A-MPDUs corresponding to the first traffic class during the BA session, and the method further includes, after stopping transmitting A-MPDUs corresponding to the first traffic class in response to receiving the BA frame, resuming transmitting, by the first communication device, A-MPDUs corresponding to the first traffic class to the second communication device during the BA session.

The indication of the change includes an indication to stop transmitting, to the second communication device, A-MPDUs that include MAC frames corresponding to any of multiple different traffic classes in a plurality of traffic classes during the BA session, wherein adopting the change in the BA session includes stopping transmitting, to the second communication device, A-MPDUs corresponding any of the multiple different traffic classes during the BA session, and the method further includes, after stopping transmitting A-MPDUs corresponding to any of the multiple different traffic classes in response to receiving the BA frame, resuming transmitting, by the first communication device, A-MPDUs corresponding to any of the multiple different traffic classes to the second communication device during the BA session.

Receiving, at the first communication device, as part of an association procedure between the first communication device and the second communication device, an association request frame from the second communication device, wherein the association request frame includes an indication that the second communication device is capable of generating a BA frame configured to cause the first communication device to adopt a change in a BA session between the first communication device and the second communication device.

Transmitting, by the first communication device, as part of an association procedure between the first communication device and the second communication device, an association response frame to the second communication device, wherein the association response frame includes an indication that the first communication device is capable of adopting a change in a BA session between by the first communication device and the second communication device.

In yet another embodiment, an apparatus an apparatus comprises a network interface device associated with a first communication device, the network interface device including one or more integrated circuit (IC) devices configured to transmit an aggregate media access control (MAC) protocol data unit (A-MPDU) that includes multiple MAC frames during a block acknowledgment (BA) session between the first communication device and a second communication device, wherein the A-MPDU is intended for the second communication device; receive a BA frame from the second communication device, wherein the BA frame includes (i) acknowledgement information to acknowledge receipt, by the second communication device, of one or more of the MAC frames included in the A-MPDU, and (ii) an indication of a change in the BA session; and in response to receiving the BA frame, adopt the change in the BA session.

In other embodiments, the apparatus further includes one of, or any suitable combination of two or more of, the following features.

The indication of the change in the BA session is included in a field of the BA frame.

The indication of the change includes an indication to stop transmitting A-MPDUs to the second communication device, wherein the one or more IC devices are configured to, in response to receiving the BA frame, stop transmitting A-MPDUs to the second communication device during the BA session; and after stopping transmitting A-MPDUs to the second communication device during the BA session, resume transmitting A-MPDUs to the second communication device during the BA session.

The indication of the change includes an indication to shorten a maximum length of A-MPDUs to be transmitted to the second communication device during the BA session, wherein the one or more IC devices are configured to, in response to receiving the BA frame, transmit only A-MPDUs having a duration less than or equal to the shortened maximum length to the second communication device during the BA session; and after transmitting only A-MPDUs having a duration less than or equal to the shortened maximum length to the second communication device during the BA session, resume transmitting A-MPDUs having lengths greater than the shortened maximum length to the second communication device during the BA session.

The indication to shorten the maximum length of A-MPDUs includes an indication of a fraction with respect to a previous maximum length of A-MPDUs, wherein the one or more IC devices are configured to transmit A-MPDUs having lengths less than or equal to the previous maximum length to the second communication device during the BA session.

The received BA frame further includes an indication of a time period during which the change in the BA session is to be effectuated; the one or more IC devices are configured to, in response to receiving the BA frame, adopted the change during the time period; and after the time period, resume use of original BA session parameters during the BA session.

The indication of the change in the BA frame includes an indication to stop transmitting A-MPDUs corresponding to the first traffic class to the second communication device during the BA session, wherein the one or more IC devices are configured to, in response to receiving the BA frame, stop transmitting, to the second communication device, A-MPDUs corresponding to the first traffic class during the BA session; and after stopping transmitting A-MPDUs corresponding to the first traffic class, resume transmitting A-MPDUs corresponding to the first traffic class to the second communication device during the BA session.

The indication of the change includes an indication to stop transmitting, to the second communication device, A-MPDUs that include MAC frames corresponding to any of multiple different traffic classes in a plurality of traffic classes during the BA session, wherein the one or more IC devices are configured to, in response to receiving the BA frame, stop transmitting, to the second communication device, A-MPDUs corresponding any of the multiple different traffic classes during the BA session; and after stopping transmitting A-MPDUs corresponding to any of the multiple different traffic classes, resume transmitting A-MPDUs corresponding to any of the multiple different traffic classes to the second communication device during the BA session.

The one or more IC devices are configured to receive, as part of an association procedure between the first communication device and the second communication device, an association request frame from the second communication device, wherein the association request frame includes an indication that the second communication device is capable of generating a BA frame configured to cause the first communication device to adopt a change in a BA session between the first communication device and the second communication device.

The one or more IC devices are configured to transmit, as part of an association procedure between the first communication device and the second communication device, an association response frame to the second communication device, wherein the association response frame includes an indication that the first communication device is capable of adopting a change in a BA session between by the first communication device and the second communication device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a first communication network, the method comprising:
   generating, at a first communication device, a block acknowledgement (BA) frame that includes (i) acknowledgement information to indicate, to a second communication device, whether the first communication device successfully received multiple media access control (MAC) frames transmitted by the second communication device during a BA session between the first communication device and the second communication device in the first communication network, and (ii) flow control information to instruct the second communication device to halt transmitting aggregate media access control (MAC) protocol data units (A-MPDUs) to avoid the second communication device interfering with a scheduled transmission in a second communication network; and
   transmitting, by the first communication device, the BA frame to the second communication device, wherein the BA frame is configured to cause the second communication device to halt transmitting A-MPDUs to avoid the second communication device interfering with the scheduled transmission in the second communication network.

2. The method of claim 1, wherein generating the BA frame includes generating a field, in the BA frame, to include the flow control information.

3. The method of claim 1, wherein the flow control information includes an indication to stop transmitting aggregate MAC protocol data units (A-MPDUs) to the first communication device.

4. The method of claim 1, wherein the flow control information includes an indication to shorten a maximum length of aggregate MAC protocol data units (A-MPDUs) to be transmitted to the first communication device.

5. The method of claim 4, wherein the indication to shorten the maximum length of A-MPDUs includes an indication of a fraction with respect to a previous maximum length of A-MPDUs.

6. The method of claim 1, wherein the BA frame is generated to further include an indication of a time period during which the second communication device is to halt transmitting A-MPDUs.

7. The method of claim 1, wherein:
   the multiple MAC frames transmitted by the second communication device correspond to a first traffic class among a plurality of traffic classes;
   generating the BA frame includes generating the BA frame to include block acknowledgement information to acknowledge the multiple MAC frames corresponding to the first traffic class; and
   the flow control information includes an indication to stop transmitting aggregate MAC protocol data units (A-MPDUs) corresponding to the first traffic class during the BA session.

8. The method of claim 1, wherein:
   the multiple MAC frames transmitted by the second communication device correspond to multiple different traffic classes among a plurality of traffic classes;
   generating the BA frame includes generating the BA frame to include block acknowledgement information to acknowledge multiple MAC frames corresponding to the multiple different traffic classes; and
   the flow control information includes an indication to stop transmitting aggregate MAC protocol data units (A-MPDUs) that include MAC frames corresponding to any of the multiple different traffic classes during the BA session.

9. The method of claim 1, further comprising:
   generating, at the first communication device, an information element (IE) that includes an indication that the first communication device is capable of generating a BA frame having the flow control information; and
   transmitting, by the first communication device, the IE in a packet to the second communication device, as part of an association procedure.

10. The method of claim 1, further comprising receiving, at the first communication device, from the second communication device, an information element (IE) that includes an indication that the second communication device is capable of responding to the flow control information to halt transmitting A-MPDUs, wherein the IE is received at the first communication device as part of a beacon frame or an association procedure.

11. An apparatus, comprising:
    a network interface device associated with a first communication device, wherein the network interface device includes one or more integrated circuit (IC) devices configured to:
       generate a block acknowledgement (BA) frame that includes (i) acknowledgement information to indicate, to a second communication device, whether the first communication device successfully received multiple media access control (MAC) frames transmitted by the second communication device during a BA session between the first communication device and the second communication device in the first communication network, and (ii) flow control information to instruct the second communication device to halt transmitting aggregate media access control (MAC) protocol data units (A-MPDUs) to avoid the second communication device interfering with a scheduled transmission in a second communication network, and
       transmit the BA frame to the second communication device, wherein the BA frame is configured to cause the second communication device to halt transmitting A-MPDUs to avoid the second communication device interfering with the scheduled transmission in the second communication network.

12. The apparatus of claim 11, wherein the one or more IC devices are configured to:
    generate a field, in the BA frame, to include the flow control information.

13. The apparatus of claim 11, wherein the flow control information includes an indication to stop transmitting aggregate MAC protocol data units (A-MPDUs) to the first communication device.

14. The apparatus of claim 11, wherein the flow control information includes an indication to shorten a maximum length of aggregate MAC protocol data units (A-MPDUs) to be transmitted to the first communication device.

15. The apparatus of claim 14, wherein the indication to shorten the maximum length of A-MPDUs includes an indication of a fraction with respect to a previous maximum length of A-MPDUs.

16. The apparatus of claim 11, wherein the one or more IC devices are configured to generate the BA frame to further include an indication of a time period during which the second communication device is to halt transmitting A-MPDUs.

17. The apparatus of claim 11, wherein:
the multiple MAC frames transmitted by the second communication device correspond to a first traffic class among a plurality of traffic classes;
the one or more IC devices are configured to generate the BA frame to include block acknowledgement information to acknowledge the multiple MAC frames corresponding to the first traffic class; and
the flow control information includes an indication to stop transmitting aggregate MAC protocol data units (A-MPDUs) corresponding to the first traffic class during the BA session.

18. The apparatus of claim 11, wherein:
the multiple MAC frames transmitted by the second communication device correspond to multiple different traffic classes among a plurality of traffic classes;
the one or more IC devices are configured to generate the BA frame to include block acknowledgement information to acknowledge multiple MAC frames corresponding to the multiple different traffic classes; and
the flow control information includes an indication to stop transmitting aggregate MAC protocol data units (A-MPDUs) that include MAC frames corresponding to any of the multiple different traffic classes during the BA session.

19. The apparatus of claim 11, wherein the one or more IC devices are configured to:
generate an information element (IE) that includes an indication that the first communication device is capable of generating a BA frame having the flow control information; and
transmit the IE in a packet to the second communication device, as part of an association procedure.

20. The apparatus of claim 11, wherein the one or more IC devices are configured to receive an information element (IE) from the second communication device, the IE received as part of a beacon frame or an association procedure, wherein the IE includes an indication that the second communication device is capable of responding to the flow control information to halt transmitting A-MPDUs.

\* \* \* \* \*